United States Patent
Lee

(10) Patent No.: US 10,027,737 B2
(45) Date of Patent: Jul. 17, 2018

(54) METHOD, APPARATUS AND COMPUTER READABLE MEDIUM FOR ACTIVATING FUNCTIONALITY OF AN ELECTRONIC DEVICE BASED ON THE PRESENCE OF A USER STARING AT THE ELECTRONIC DEVICE

(71) Applicant: Samsung Electronics Co., Ltd., Gyeonggi-do (KR)

(72) Inventor: Ji-Hoon Lee, Gyeongsangnam-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 459 days.

(21) Appl. No.: 14/221,658

(22) Filed: Mar. 21, 2014

(65) Prior Publication Data

US 2015/0121228 A1    Apr. 30, 2015

(30) Foreign Application Priority Data

Oct. 31, 2013  (KR) ........................ 10-2013-0131156

(51) Int. Cl.

| | | |
|---|---|---|
| *G06F 3/048* | (2013.01) | |
| *G06F 3/00* | (2006.01) | |
| *G06K 9/00* | (2006.01) | |
| *H04L 29/08* | (2006.01) | |
| *G06F 3/0487* | (2013.01) | |
| *G06F 1/16* | (2006.01) | |
| *G06F 3/01* | (2006.01) | |
| *G06F 3/0346* | (2013.01) | |
| *G06F 1/32* | (2006.01) | |
| *G06F 3/0488* | (2013.01) | |

(52) U.S. Cl.
CPC ............ *H04L 67/025* (2013.01); *G06F 1/163* (2013.01); *G06F 1/1694* (2013.01); *G06F 1/3231* (2013.01); *G06F 1/3262* (2013.01); *G06F 1/3265* (2013.01); *G06F 1/3287* (2013.01); *G06F 3/017* (2013.01); *G06F 3/0346* (2013.01); *G06F 3/0487* (2013.01); *G06F 3/0488* (2013.01); *Y02D 10/153* (2018.01); *Y02D 10/171* (2018.01); *Y02D 10/173* (2018.01)

(58) Field of Classification Search
CPC ........ G06F 1/32; G06F 3/0167; G06F 3/0487; G06F 3/048; G06F 3/00; G06F 1/16; G06F 9/00; G06F 3/041; G06K 9/00
USPC ........................................................ 715/727
See application file for complete search history.

(56) References Cited

U.S. PATENT DOCUMENTS

| | | | | |
|---|---|---|---|---|
| 3,876,979 | A * | 4/1975 | Winn ................... | H04L 1/1806 714/748 |
| 5,765,045 | A * | 6/1998 | Takagi ................. | G02B 7/287 396/51 |
| 6,371,616 | B1 | 4/2002 | Doany et al. | |

(Continued)

FOREIGN PATENT DOCUMENTS

KR    10-2001-0051469 A    6/2001

*Primary Examiner* — Hugo Molina
(74) *Attorney, Agent, or Firm* — Cha & Reiter, LLC.

(57) ABSTRACT

Provided herein is a control method of an electronic device. A gesture is detecting and a plurality of images of a user are photographed, if the gesture substantially corresponds to a predetermined gesture. A predetermined function is performed, if the change detected in the images is less than a predetermined threshold during a predetermined time period.

13 Claims, 10 Drawing Sheets

(56) References Cited

U.S. PATENT DOCUMENTS

| | | | | |
|---|---|---|---|---|
| 8,957,847 B1* | 2/2015 | Karakotsios | G06F 3/013 | 345/156 |
| 9,063,574 B1* | 6/2015 | Ivanchenko | G06F 3/017 | |
| 9,189,069 B2* | 11/2015 | Hinckley | G06F 1/1626 | |
| 9,196,239 B1* | 11/2015 | Taylor | G06F 3/017 | |
| 2007/0257097 A1* | 11/2007 | Nurmela | G06F 1/1626 | 235/375 |
| 2008/0259047 A1* | 10/2008 | Jung | H04M 1/23 | 345/173 |
| 2008/0267459 A1* | 10/2008 | Nakada | G09B 21/009 | 382/118 |
| 2009/0265671 A1* | 10/2009 | Sachs | G06F 3/017 | 715/863 |
| 2010/0223582 A1* | 9/2010 | Dods | G06F 1/1694 | 715/863 |
| 2010/0321289 A1* | 12/2010 | Kim | G06F 1/1626 | 345/156 |
| 2012/0169594 A1* | 7/2012 | Zhao | G09G 3/3406 | 345/158 |
| 2012/0288139 A1* | 11/2012 | Singhar | G06F 1/3265 | 382/103 |
| 2013/0015946 A1* | 1/2013 | Lau | G07C 9/00 | 340/5.2 |
| 2013/0016882 A1* | 1/2013 | Cavallini | G06K 9/629 | 382/117 |
| 2013/0135198 A1* | 5/2013 | Hodge | G06F 3/013 | 345/156 |
| 2013/0162525 A1* | 6/2013 | Ye | G06F 3/017 | 345/156 |
| 2013/0314303 A1* | 11/2013 | Osterhout | G06F 3/005 | 345/8 |
| 2014/0059066 A1* | 2/2014 | Koloskov | G06F 17/30017 | 707/758 |
| 2014/0298353 A1* | 10/2014 | Hsu | G06F 9/54 | 719/313 |
| 2014/0368423 A1* | 12/2014 | Brenckle | G06F 3/017 | 345/156 |
| 2015/0062022 A1* | 3/2015 | Rabii | G06T 1/20 | 345/173 |
| 2015/0091790 A1* | 4/2015 | Forutanpour | G06F 3/011 | 345/156 |

* cited by examiner

METHOD, APPARATUS AND COMPUTER READABLE MEDIUM FOR ACTIVATING FUNCTIONALITY OF AN ELECTRONIC DEVICE BASED ON THE PRESENCE OF A USER STARING AT THE ELECTRONIC DEVICE

CROSS-REFERENCE TO RELATED APPLICATION(S)

This application claims the benefit under 35 U.S.C. § 119(a) of a Korean patent application filed in the Korean Intellectual Property Office on Oct. 31, 2013 and assigned Serial No. 10-2013-0131156, the entire disclosure of which is incorporated herein by reference.

TECHNICAL FIELD

The present disclosure relates generally to a method, apparatus, and non-transitory computer-readable medium for controlling an electronic device according to a user's gesture.

BACKGROUND

Services and additional functions provided by electronic devices (e.g., a mobile device) have been increasing of late, in order to raise an effective value of an electronic device and to satisfy users. Various applications executable in an electronic device have been developed to meet this increasing consumer demand.

An electronic device may be equipped with basic applications developed by a manufacturing company of the electronic device or may download additional applications from websites throughout the Internet. These additional applications may be developed by developers registered with the application sales website. Anyone who has developed applications can freely sell the applications to a user of the electronic device through such sites. Today, tens to hundreds of thousands of applications are offered for free or for a sum of money to different types of electronic devices.

SUMMARY

One type of electronic device is a watch-type device controlled using buttons or a touch screen. However, buttons available in conventional devices (e.g., a mobile device) with large touch screens and User Experience ("UX") may not be suitable for watch-type devices, since use of the watch-type device may become awkward or inefficient due to these type of buttons. Furthermore, watch-type devices may have low battery efficiency due to its poor power management for screen display.

In view of the above, aspects of the present disclosure address at least some of the above-mentioned problems and/or disadvantages. Accordingly, one aspect of the present disclosure provides a method, apparatus, and non-transitory computer-readable medium that may detect a gesture, determine whether the detected gesture substantially corresponds to a predetermined gesture, and perform a predetermined function according to the result of the determination.

Another aspect of the present disclosure provides a method, apparatus, and non-transitory computer-readable medium that may photograph a plurality of images of a user, detect whether a change has occurred in the images of the user during a predetermined time period, and perform a predetermined function, if the change detected in the images is less than a predetermined threshold during the predetermined time period.

Still another aspect of the present disclosure provides a method, apparatus, and non-transitory computer-readable medium that may display information corresponding to an application being executed in a second electronic device, if the change detected in the images is less than the predetermined threshold during the predetermined time period.

In accordance with a further aspect of the present disclosure, a control method of an electronic device is provided that may include: detecting a gesture; photographing a plurality of images of a user, if the gesture substantially corresponds to a predetermined gesture; detecting whether a change has occurred in the images of the user during a predetermined time period; and performing a predetermined function, if the change detected in the images is less than a predetermined threshold during the predetermined time period.

In accordance with yet a further aspect of the present disclosure, an electronic device is provided that may include a camera unit and a sensor unit to detect a gesture. In a further example a controller is provided that may detect whether the gesture substantially corresponds to a predetermined gesture; photograph a plurality of images of a user with the camera unit, if the gesture substantially corresponds to the predetermined gesture; detect whether a change occurs in the images during a predetermined time period; and perform a predetermined function, if the change detected in the images is less than a predetermined threshold during the predetermined time period.

Information about the control method of the electronic device may be stored in a non-transitory computer-readable medium. The non-transitory computer-readable medium may include all kinds of recording medium in which programs and data can be stored to be readable by a computer system. Examples of suitable non-transitory computer-readable medium may include, but are not limited to, Read-Only Memory (ROM), Random Access Memory (RAM), Compact Disk (CD), Digital Video Disk-Read Only Memory (DVD-ROM), magnetic tapes, floppy disks, optical data storage devices, and an embedded Multi Media Card (eMMC). Further, the non-transitory computer readable medium may be distributed over a network coupled computer systems so that the computer readable code may be stored and executed in a distributed fashion.

Other aspects, advantages, and features of the disclosure will become apparent to those skilled in the art from the following detailed description in conjunction with the annexed drawings. The present disclosure contains examples of the technology.

BRIEF DESCRIPTION OF THE DRAWINGS

The above and other aspects, features and advantages of certain examples of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
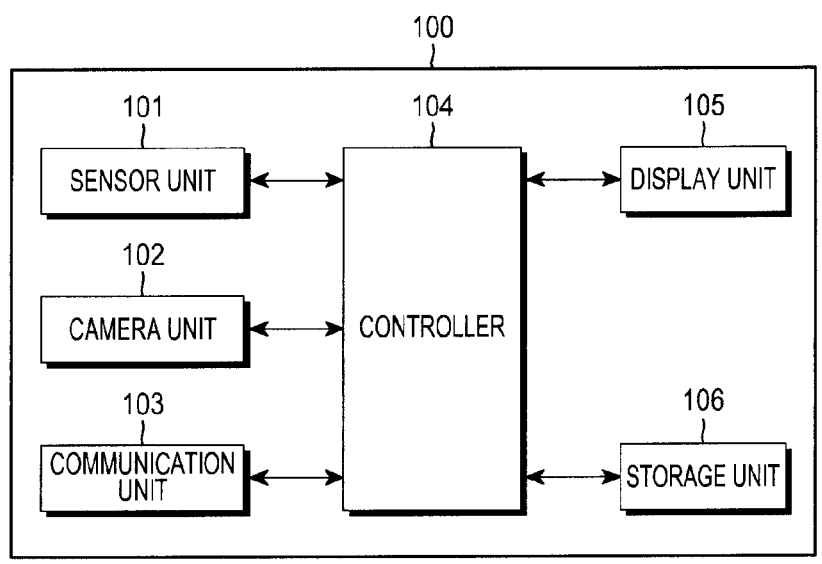
FIG. 1 is a block diagram illustrating a configuration of an example electronic device in accordance with aspects of the present disclosure.

Example embodiments of the present disclosure are disclosed herein. However, specific structural and functional details disclosed herein are merely representative for purposes of describing example embodiments of the present disclosure. Furthermore, example embodiments of the present disclosure may be implemented in many alternate forms and should not be construed as limited to the examples disclosed herein.

Accordingly, while the disclosure is susceptible to various modifications and alternative forms, specific examples thereof are shown by way of illustrations in the drawings and will be described in detail herein. It should be understood, however, that there is no intent to limit the disclosure to the particular forms disclosed, but on the contrary, the disclosure is to cover all modifications, equivalents, and alternatives falling within the spirit and scope of the disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Examples of the present disclosure relate to a method and apparatus for controlling an electronic device to detect a gesture, to determine whether the detected gesture corresponds to a predetermined gesture, and to perform a predetermined function according to the result of the determination.

Also, examples of the present disclosure relate to a method and apparatus for controlling an electronic device to photograph a plurality of images of a user and to detect whether a change has occurred in the images of the user during a predetermined time period, and to perform a predetermined function according to the result of the determination.

In examples of the present disclosure, which will be described below, an electronic device may be any device including at least one processor, and the electronic device may include a camera, a portable device, a mobile terminal, a communication terminal, a portable communication terminal, and a portable mobile terminal. For example, the electronic device may be a digital camera, a smart phone, a mobile phone, a game, a television (TV), a display device, a head unit for vehicle, a notebook computer, a laptop computer, a tablet computer, a Personal Media Player (PMP), Personal Digital Assistants (PDA), a navigation system, an Automated Teller Machine (ATM), or a Point Of Sales (POS) terminal. Also, the electronic device may be a flexible device or a flexible display device. Also, the electronic device may be a wearable device (e.g., a watch-type device, a glasses-type device, and a clothes-type device).

Hereinafter, examples of the present disclosure will be described in detail with reference to the appended drawings so that one of ordinary skill in the art can easily practice the technology disclosed herein.

First, a configuration of an electronic device in accordance with aspects of the present disclosure will be described with reference to FIG. 1, and then, methods according to embodiments of the present disclosure will be described in detail with reference to FIGS. 2 and 3.

In the following description, the electronic device may be a wearable device (e.g., a watch-type device), however, embodiments of the present disclosure are not limited to a wearable device.

FIG. 1 is a block diagram illustrating a configuration of an electronic device in accordance with aspects of the present disclosure. Referring to FIG. 1, an electronic device 100 in accordance with aspects of the present disclosure may include a sensor unit 101, a camera unit 102, a controller 104, and a display unit 105. In another example, the electronic device 100 may further include a communication unit 103 and a storage unit 106.

The sensor unit 101 may detect a gesture, such as a gesture made by a user of the device. The gesture may be any one of: a gesture of raising an arm that wears the electronic device 100; a gesture of lowering an arm that wears the electronic device 100; a gesture of twisting a wrist upward; a gesture of twisting a wrist downward; and a gesture of bending an arm inward. However, the foregoing is a non-exhaustive list and it is understood that they are not limited to these gestures. The sensor unit 101 may transfer information about the detected gesture to the controller 104. The sensor unit 101 may include at least one sensor capable of detecting a gesture. The sensor may be a gyro sensor, an accelerometer sensor, a proximity sensor, a rotation angle sensor, a level sensor, a vibration sensor, a weight sensor, or a pressure sensor. However, the sensor is not limited to the above-mentioned sensors.

According to another embodiment, the electronic device 100 may include a plurality of sensor units.

The camera unit 102 may photograph a plurality of images of the user, such as a part of the user's body (e.g., a user's face contour and pupils). For example, the camera unit 102 may photograph the user's body part for a predetermined time period in order to determine whether the user has been staring at the electronic device 100.

The camera unit 102 may transfer images of the photographed user's body part to the controller 104.

If the controller 104 receives the information regarding a gesture detected by the sensor unit 101, the controller 104 may compare the gesture to a predetermined gesture. For example, if the controller 104 determines that the gesture substantially corresponds to the predetermined gesture (e.g., based on gesture similarity), the controller 104 may enable the camera unit 102.

In one example, the controller 104 may receive a plurality of images of the user photographed by the camera unit 102. In another example, the controller 104 may determine whether the user has been staring for a predetermined time period (e.g., 1 or 2 seconds), based on the images. In yet a further example, a method of determining whether a user has been staring is to identify a user's face contours from the photographed images and to determine whether a change has occurred in the images. In one example, the changes could be in the user's face contours. In a further example, if the changes detected in the images is less than a predetermined threshold during the predetermined time period, the controller 104 may perform a predetermined function. For example, if a change detected in the user's face contours is less than the predetermined threshold for the predetermined time period, the controller 104 may determine that the user has been staring at the electronic device 100. In yet another aspect, a method of determining whether a user has been staring may be to identify a user's pupils from the photographed images and to determine whether a change(s) between the user's pupils is less than a predetermined threshold for a predetermined time period. If the change(s) between the user's pupils is less than the predetermined threshold for the predetermined time period, the controller 104 may determine that the user has been staring at the electronic device 100. If the controller 104 determines that the user has been staring for the predetermined time period, the controller 104 may perform the predetermined function, and if the controller 104 determines that the user has not been staring for the predetermined time period, the controller 104 may control the sensor unit 101 to again detect the current gesture.

In a further example, the controller 104 may control the communication unit 103 to connect to a second electronic device, and control the display unit 105 to display information corresponding to an application being executed in the second electronic device in accordance with the gesture of a user and/or a determination of whether the user has been staring. The controller 104 may control the storage unit 106 to store the information displayed on the display unit 105.

The controller 104 may control the communication unit 103 to connect to the second electronic device through various communication networks, such as a Personal Area Network (PAN), a Local Area Network (LAN), a Metropolitan Area Network (MAN), and a Wide Area Network (WAN).

The controller 104 may control the communication unit 103 to connect to the second electronic device using wireless transmission technology for short-range communication, such as Infrared Data Association (IrDA) or Bluetooth. Also, the controller 104 may control the communication unit 103 to receive signals from the second electronic device through a cable broadcasting communication network, a terrestrial broadcasting communication network, or a satellite broadcasting communication network. The controller 104 may control overall operations of the electronic device 100.

The display unit 105 may display information (e.g., a watch mode, an idle mode, a music play mode, or a video play mode) that can be provided by the electronic device 100. The display unit 105 may display information (e.g., information corresponding to an application of the second electronic device) of the second electronic device, input through a control operation of the controller 104.

Accordingly, the communication unit 103 may perform an operation for connecting to the second electronic device under the control of the controller 104. Storage unit 106 may store information (e.g., a watch mode, an idle mode, a music play mode, a video play mode, or information corresponding to an application of the second electronic device) input through a control operation of the controller 104.

Figure 2:
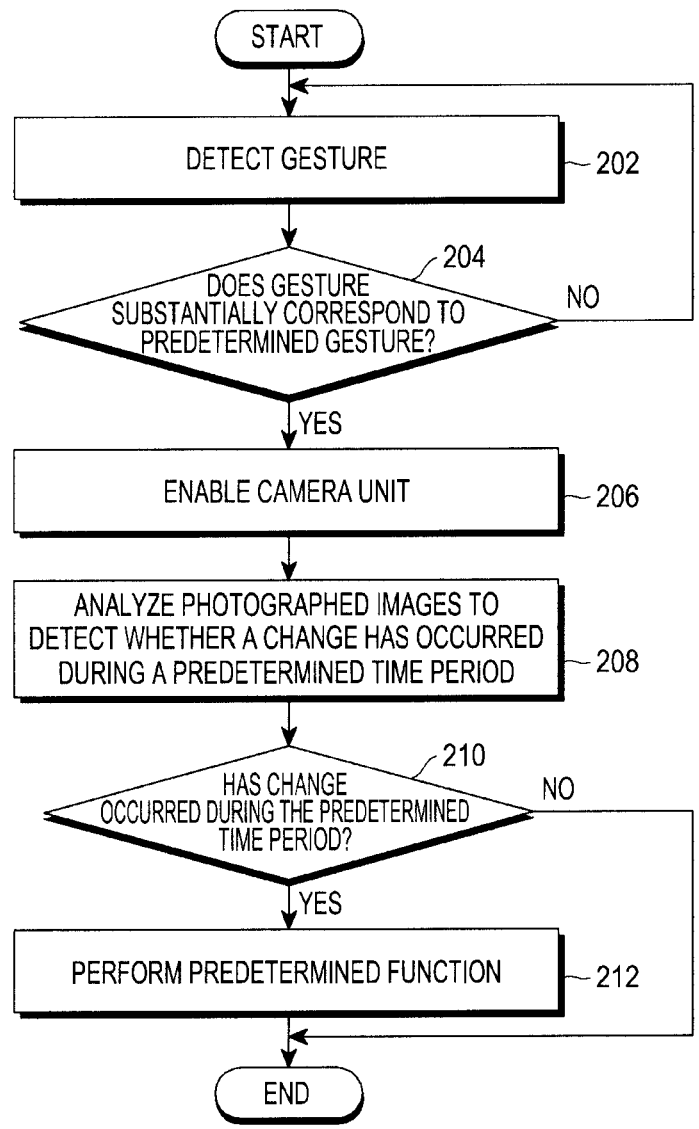
FIG. 2 is a flowchart illustrating an example method of performing a predetermined function in an electronic device, according to aspects of the present disclosure.

FIG. 2 is a flowchart illustrating a method of performing a predetermined function in an electronic device, in accordance with aspects of the present disclosure. Referring to FIG. 2, the electronic device (e.g., a wearable device including a watch-type device) may determine whether it is worn on a user's body part (e.g., a left or right wrist). For example, if the sensor unit 101 (see FIG. 1) detects a user's skin, humidity, or temperature, the electronic device may determine that the electronic device is worn on a user's body part. However, in a further example, a determination of whether the electronic device is worn on a user's body part may be omitted.

The electronic device may detect a gesture (e.g., a gesture of raising an arm that wears the electronic device, a gesture of lowering an arm that wears the electronic device, a gesture of twisting a wrist upward, a gesture of twisting a wrist downward, and a gesture of bending an arm inward), through the sensor unit 101 (operation 202). In a further example, the electronic device may detect the gesture by measuring linear acceleration or rotary acceleration according to a movement direction of a predetermined gesture.

The electronic device may determine whether the gesture substantially corresponds to a predetermined gesture (operation 204). If the electronic device determines that the gesture substantially corresponds to the predetermined gesture, the electronic device may enable the camera unit 102 (see FIG. 1) (operation 206).

The electronic device may photograph a plurality of images of a user with the camera unit 102 and analyze the images to detect whether a change occurs in the images during a predetermined time period (operations 208 and 210). The detected change may be used to determine whether the user has been staring at the electronic device. In on example, criteria for determining whether a user has been staring may be as follows.

In one example, when camera unit 102 begins operating, the electronic device may set a maximum photographing time to approximately 5 seconds and set a reference time or predetermined time to approximately 1 second. This reference time may be used as the criteria for determining whether a user has been staring. In a further example, if the electronic device determines that a user has been staring for approximately 1 second or more through the camera unit 102 (e.g., when neither a movement of the user's pupils nor a change of the user's face contour have occurred for 1 second or more), the electronic device may determine that the user has been staring for the predetermined time period. The electronic device may perform a predetermined function based on this determination (operation 212). In accordance with aspects of the present disclosure, the predetermined function may be a function of turning on a screen of the electronic device. However, the predetermined function is not limited to this.

The user may stare at the camera unit 102 when the camera unit 102 starts operating or after 1 second from when the camera unit 102 starts operating. For example, if the user has been staring at the camera unit 102 for a predetermined time period, the electronic device may determine that the user has been staring at the electronic device for the predetermined time period.

In one example, a maximum photographing time may be set to approximately 5 seconds, and a reference time, which is the criteria for determining whether a user has been staring (e.g., the predetermined time), may be set to approximately 1 second. However, it is understood that the forgoing times are merely illustrative and that the present disclosure is not limited to these example time frames. That is, the maximum photographing time and the reference time may be adjusted to different times.

As such, in one example, the electronic device may detect a gesture, determine whether the detected gesture substantially corresponds to a predetermined gesture, and determine whether the user has been staring at the electronic device, thereby performing a predetermined function.

Figure 3:
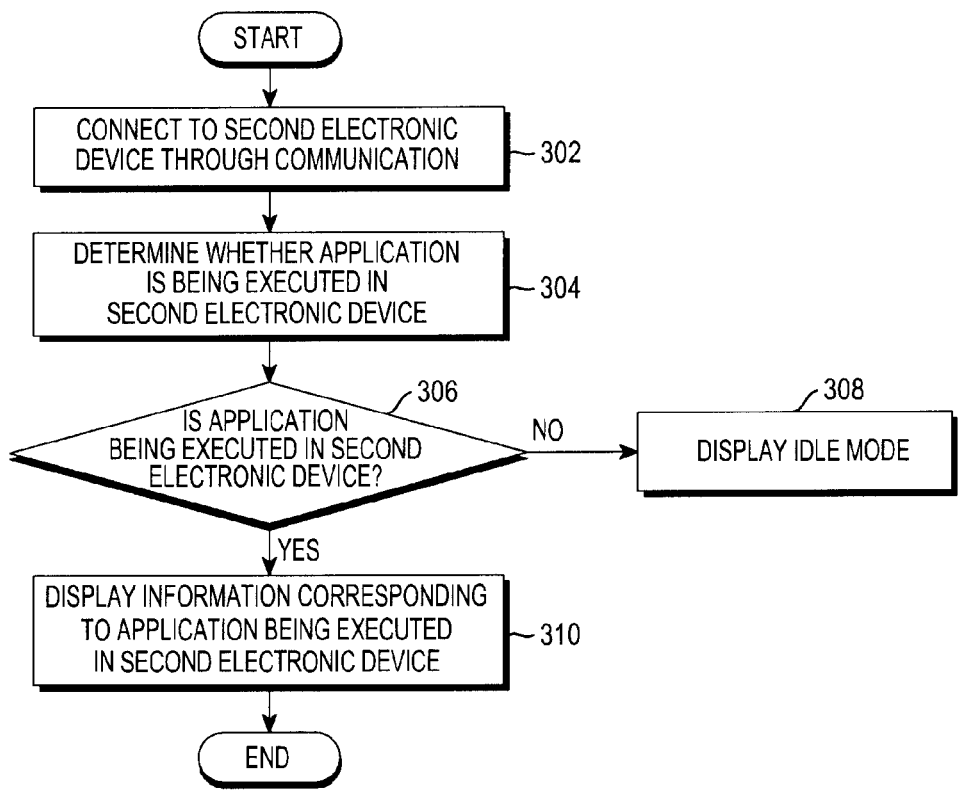
FIG. 3 is a flowchart illustrating an example method of displaying a screen in an electronic device, according to another aspect of the present disclosure.

FIG. 3 is a flowchart illustrating a method of displaying a screen in the electronic device in accordance with aspects of the present disclosure. Referring to FIG. 3, the electronic device (e.g., a wearable device such as a watch-type device), which will be referred to as a first electronic device, may connect to a second electronic device (e.g., a mobile device) through communication (operation 302). The first electronic device may determine whether an application is being executed in the second electronic device (operations 304 and 306). If the first electronic device determines that an application is being executed in the second electronic device, the first electronic device may detect a gesture substantially corresponding to a predetermined gesture; photograph a plurality of images of a user with the camera unit; detect whether a change occurs in the images during a predetermined time period as described above with reference to FIG. 2; and display information corresponding to the application being executed in the second electronic device. The information may be displayed, if the first electronic device has detected a gesture substantially corresponding to the predetermined gesture and if the change detected in the images is less than a predetermined threshold during the predetermined time period (e.g., if the user is staring at the electronic device).

In contrast, if the first electronic device determines that there is no application being executed in the second electronic device, the first electronic device may display an idle mode (e.g., a watch mode or a screen off mode) (operation 308).

In another example, the first electronic device may detect a gesture, and determine whether the user has been staring, thereby displaying information corresponding to an application being executed in the second electronic device.

Meanwhile, the first electronic device may display information corresponding to the application being executed in the second electronic device, as follows.

TABLE 1

| Application Being Executed in Second Electronic Device | Information Displayed on First Electronic Device |
|---|---|
| Calling | Call time and Call Details. |
| Reception of Message or E-mail | Text of Message or E-mail |
| Music Player | Music List and Play State |
| Exercising | Information Related to Exercise |
| None | Idle Mode |

Referring to Table 1, if the first electronic device detects a predetermined gesture and determines that the user has been staring based on the plurality of images taken of the user, the first electronic device may display all information corresponding to an application being executed in the second electronic device on a display unit. If an application being executed in the second electronic device is a call application, the first electronic device may display information (e.g., a call time and call details) corresponding to the call application. The first electronic device may display information corresponding to various applications (e.g., reception of a message or E-mail, a music player, exercise, etc.) being executed in the second electronic device.

As such, according to aspects of the present disclosure, by detecting a gesture to enable a camera and analyzing images photographed by the camera to determine whether the user has been staring, the first electronic device can provide UX optimized for a user. Also, by displaying information corresponding to an application being executed in the second electronic device, the first electronic device can efficiently display a user's desired screen.

Figure 4:
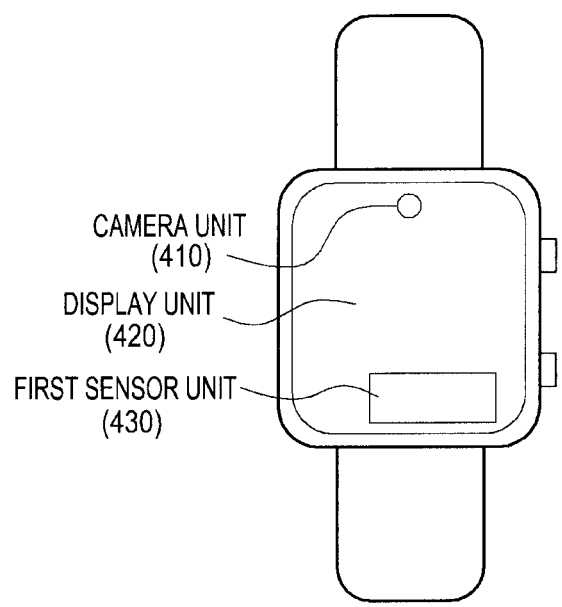
FIG. 4 illustrates a part of a configuration of an electronic device according to aspects of the present disclosure.

FIG. 4 illustrates a part of a configuration of an electronic device in accordance with aspects of the present disclosure. Referring to FIG. 4, the electronic device may be a wearable device. The wearable device may be a watch-type device that may include a camera unit 410, a display unit 420, and a first sensor unit 430.

The camera unit 410 may photograph a user's body part (e.g., a face contour and pupils). For example, the camera unit 410 may photograph the user's body part for a predetermined time period. The predetermined time period may vary depending on criteria for determining whether a user has been staring at the electronic device.

The display unit 420 may display information (e.g., a watch mode, an idle mode, a music play mode, or a video play mode) that can be provided by the electronic device. The display unit 420 may display information of a second electronic device, for example, information corresponding to an application being executed in a second electronic device.

The first sensor unit may detect a gesture. The gesture may be any one of: a gesture of raising an arm that wears the electronic device; a gesture of lowering an arm that wears the electronic device; a gesture of twisting a wrist upward; a gesture of twisting a wrist downward; and a gesture of bending an arm inward. However, the user's gesture is not limited to these gestures. The first sensor unit 430 may include at least one sensor capable of detecting a gesture. The sensor may be a gyro sensor, an accelerometer sensor, a proximity sensor, a rotation angle sensor, a level sensor, a vibration sensor, a weight sensor, or a pressure sensor. However, the sensor is not limited to the foregoing sensors.

The embodiment illustrated in FIG. 4 shows a structure from the perspective of a user staring at the front part of the electronic device, for example, a perspective from which a user can see a current time when the user stares at the device. An embodiment illustrated in FIG. 5 shows a perspective of a user staring at the rear part of the electronic device, for example, a perspective from which a user cannot see a current time when the user stares at the device.

Figure 5:
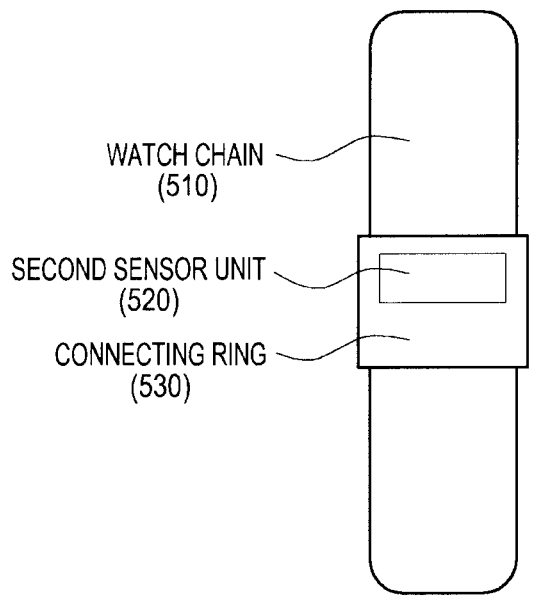
FIG. 5 illustrates a part of a configuration of an electronic device according to aspects of the present disclosure.

FIG. 5 illustrates a part of a configuration of an electronic device in accordance with aspects of the present disclosure. Referring to FIG. 5, the electronic device may be a wearable device. The wearable device may include a watch-type device that may include a watch chain 510, a second sensor unit 520, and a connecting ring 530.

The watch chain 510 may be used to wear the electronic device on a user's body part (e.g., a left or right wrist). For example, the watch chain 510 may be realized to surround the user's body part.

The second sensor unit 520 may detect the user's skin, humidity, or temperature to thereby determine whether the electronic device is being worn on the user's body part. The second sensor unit 520 may detect the user's gesture after detecting the user's skin, humidity, or temperature to determine whether the electronic device has been worn on the user's body part. In a further example, the second sensor unit 520 may detect the user's gesture without determining whether the electronic device has been worn on the user's body part. In a further example, if the user's skin, humidity and temperature are not detected, the second sensor unit 520 may not try to detect the gesture of a user in order to prevent unnecessary power consumption.

The connecting ring 530 may make a loop of the watch chain 510 when the electronic device is worn on the user's body part (e.g., a left or right wrist).

Figure 6:
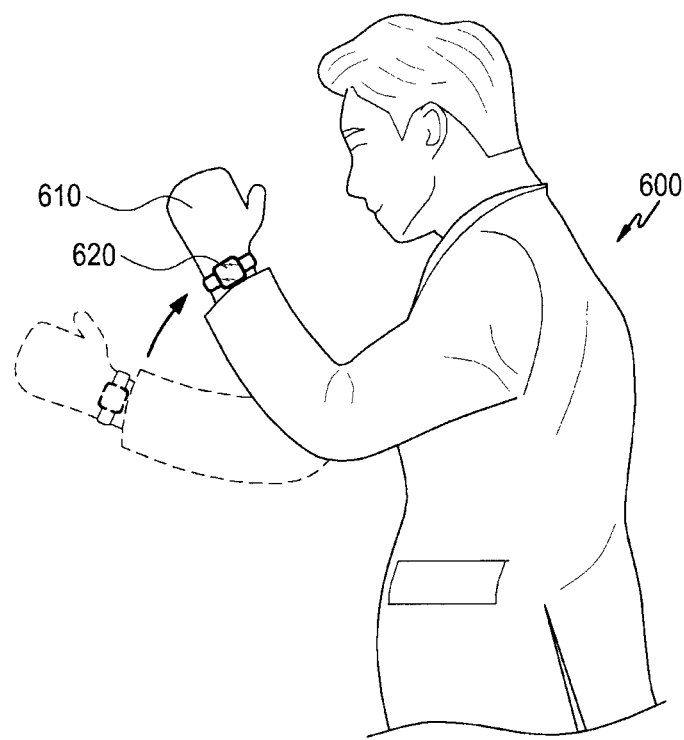
FIG. 6 is a view for describing an example of detecting a user's gesture in an electronic device, according to aspects of the present disclosure.

FIG. 6 illustrates a working example of detecting a gesture in an electronic device, in accordance with aspects of the present disclosure. Referring to FIG. 6, a user 600 may wear a watch-type device 620 which is an example of a wearable device on his/her wrist, and make a gesture of moving his/her arm 610. The gesture may be any one of: a gesture of raising his/her arm 610 that wears the watch-type device 620; a gesture of lowering his/her arm 610 that wears the watch-type device 620; a gesture of twisting his/her wrist upward, a gesture of twisting his/her wrist downward; and a gesture of bending his/her arm 610 inward. However, the user's gestures are not limited to these gestures.

If the user makes the gesture, the watch-type device 620 may detect the gesture. The watch-type device 620 may compare the gesture to a predetermined gesture. If the watch-type device 620 determines that the gesture is substantially similar or identical to the predetermined gesture, the watch-type device 620 may enable a camera unit.

As such, according to aspects of the present disclosure, the watch-type device 620 may detect a gesture of the user 600 and determine whether the detected gesture of the user 600 is substantially identical or similar to a predetermined gesture, which may trigger a predetermined function based further on the images of the user. The predetermined function may be a function of turning on a screen of the watch-type device 620.

Figure 7:
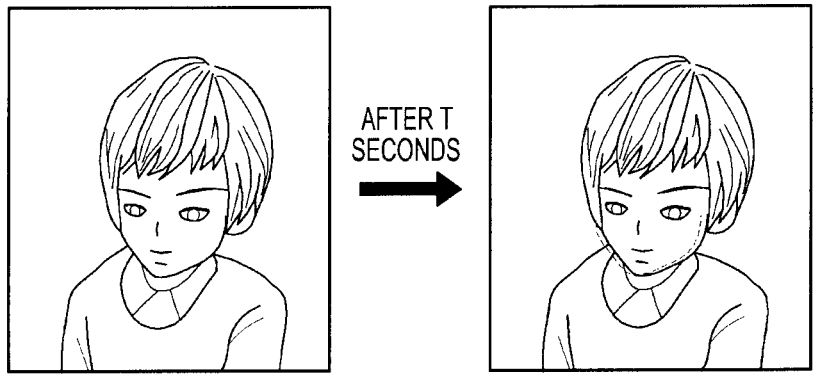
FIG. 7 is a view for describing an example of determining whether a user has been staring, according to aspects of the present disclosure.

FIG. 7 is a view for describing an example of determining whether a user has been staring, in accordance with aspects of the present disclosure. Referring to FIG. 7, the electronic device may photograph a user's body part (e.g., a face contour) through a camera unit. For example, the electronic device may photograph the user's body part for a predetermined time period (e.g., T seconds), and the predetermined time period may vary depending on criteria for determining whether a user has been staring. When a change of the user's face contour (e.g., a change of a face contour corresponding to a degree of movement that is made when a user chews food, a degree of movement that is made when a strong wind blows, or a predetermined change of a face contour) is detected while the electronic device photographs the user's body part for T seconds, the electronic device may determine that the user has been staring if the change falls within a predetermined threshold.

Figure 8:
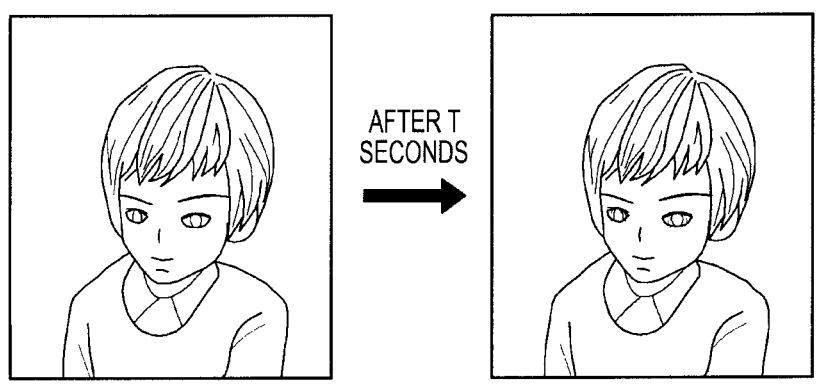
FIG. 8 is a view for describing an example of determining whether a user has been staring, according to aspects of the present disclosure.

FIG. 8 is a view for describing an example of determining whether a user has been staring in accordance with aspects of the present disclosure. Referring to FIG. 8, an electronic device may photograph a user's body part (e.g., pupils) through a camera unit. For example, the electronic device may photograph the user's body part for a predetermined time period (e.g., T seconds). The predetermined time period may vary depending on criteria for determining whether the user has been staring. When a movement of the user's pupils is detected while the electronic device photographs the user's pupils for T seconds, the electronic device may determine that the user has been staring if the movement falls within the predetermined threshold. The changes may be detected in the plurality of images of the user.

FIGS. 9 to 12 are views for describing examples of displaying screens in an electronic device, according to embodiments of the present disclosure.

Referring to FIGS. 9 to 12, the electronic device (e.g., a wearable electronic device such as a watch-type device) may be in an off state corresponding to an idle screen. In one example, the electronic device may detect a gesture; photograph a plurality of images of a user, if the gesture substantially corresponds to the predetermined gesture; detect whether a change occurs in the images during a predetermined time period; and perform a predetermined function, if the change detected in the images is less than a predetermined threshold during the predetermined time period. The predetermined function may comprise displaying information corresponding to an application being executed in a second electronic device.

Figure 9:
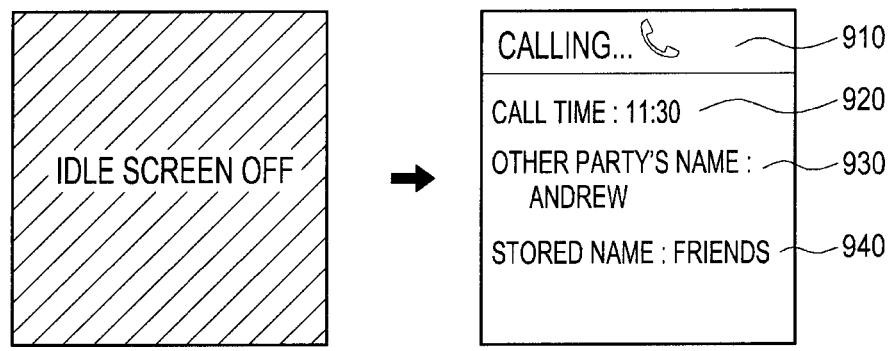
FIG. 9, FIG. 10, FIG. 11 and FIG. 12 are views for describing examples of displaying screens in an electronic device, according to aspects of the present disclosure.

In accordance with aspects of the present disclosure, if a user has made a predetermined gesture and has been staring at the first electronic device during the predetermined time, the idle screen of the first electronic device may change to a screen corresponding to a predetermined application, as illustrated in FIG. 9. For example, if the electronic device enters a call mode, the electronic device may display information 910 indicating the call mode, and information (e.g., a call time 920, the other party's name 930, and a stored name 940) related to the call mode.

Figure 10:
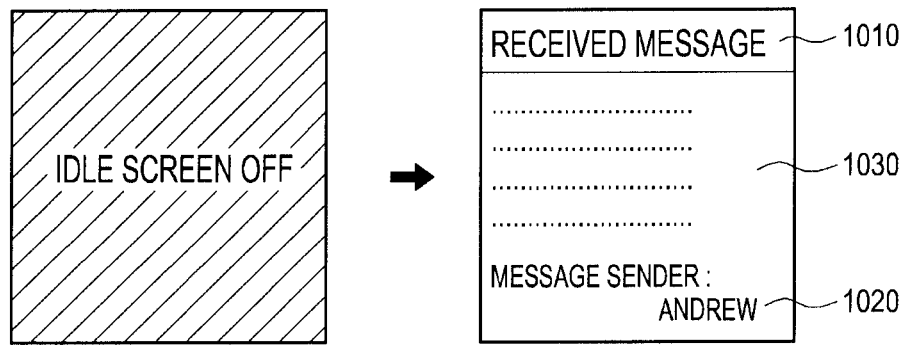

In a further example, if the user has made a predetermined gesture and has been staring at the electronic device during the predetermined time, the idle screen of the electronic device may change to a screen corresponding to a predetermined application, as illustrated in FIG. 10. For example, if the electronic device enters a message reception mode, the electronic device may display information 1010 indicating the message reception mode, and information (e.g., a message sender 1020 and message text 1030) related to the message reception mode.

Figure 11:
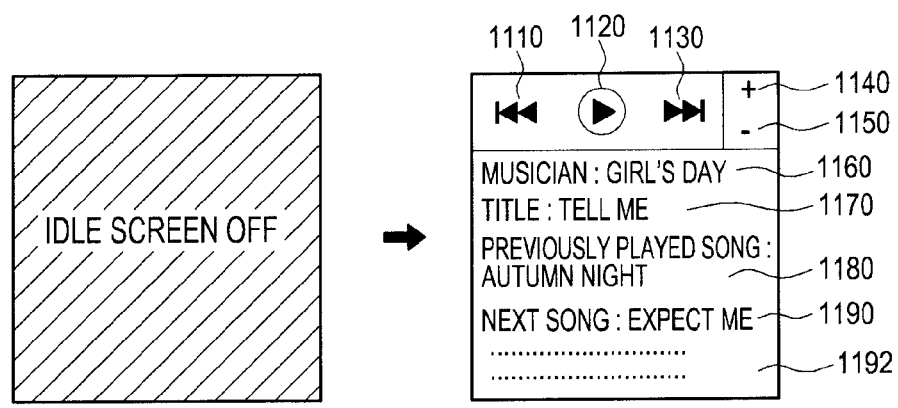

According to yet another embodiment of the present disclosure, if the user has made a predetermined gesture and has been staring at the electronic device during the predetermined time, the idle screen of the electronic device may change to a screen corresponding to a predetermined application, as illustrated in FIG. 11. For example, if the electronic device enters a music play mode, the electronic device may display information (e.g., a go-to-previous song function icon 1110, a play function icon 1120, a go-to-next song function icon 1130, a volume-up function icon 1140, a volume-down function icon 1150, a musician's name 1160, a title 1170 of a song being currently played, a title 1180 of a previously played song, a title 1190 of a next song, and lyrics 1192) related to the music play mode.

Figure 12:
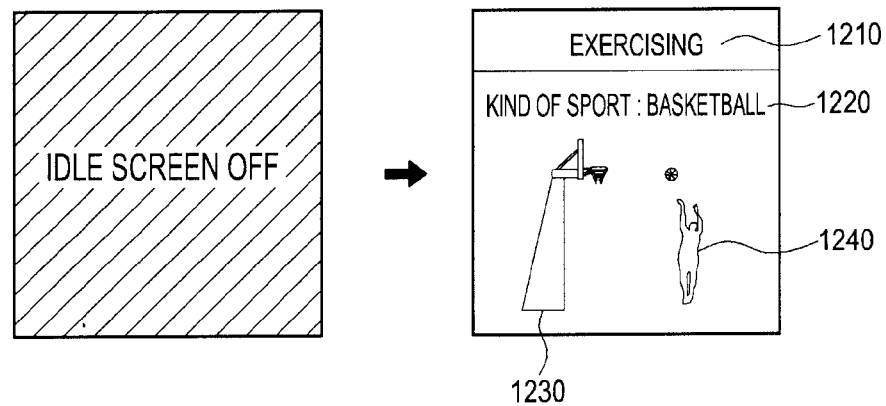

According to still yet another embodiment of the present disclosure, if the user has taken a predetermined gesture and has been staring at the electronic device during the predetermined time, the idle screen of the electronic device may change to a screen corresponding to a predetermined application, as illustrated in FIG. 12. For example, if the electronic device enters an exercise mode, the electronic device may display information 1210 indicating the exercise mode, and information (e.g., a kind of sport 1220, a basketball stand 1230, and a player 1240) related to the exercise mode.

Figure 13:
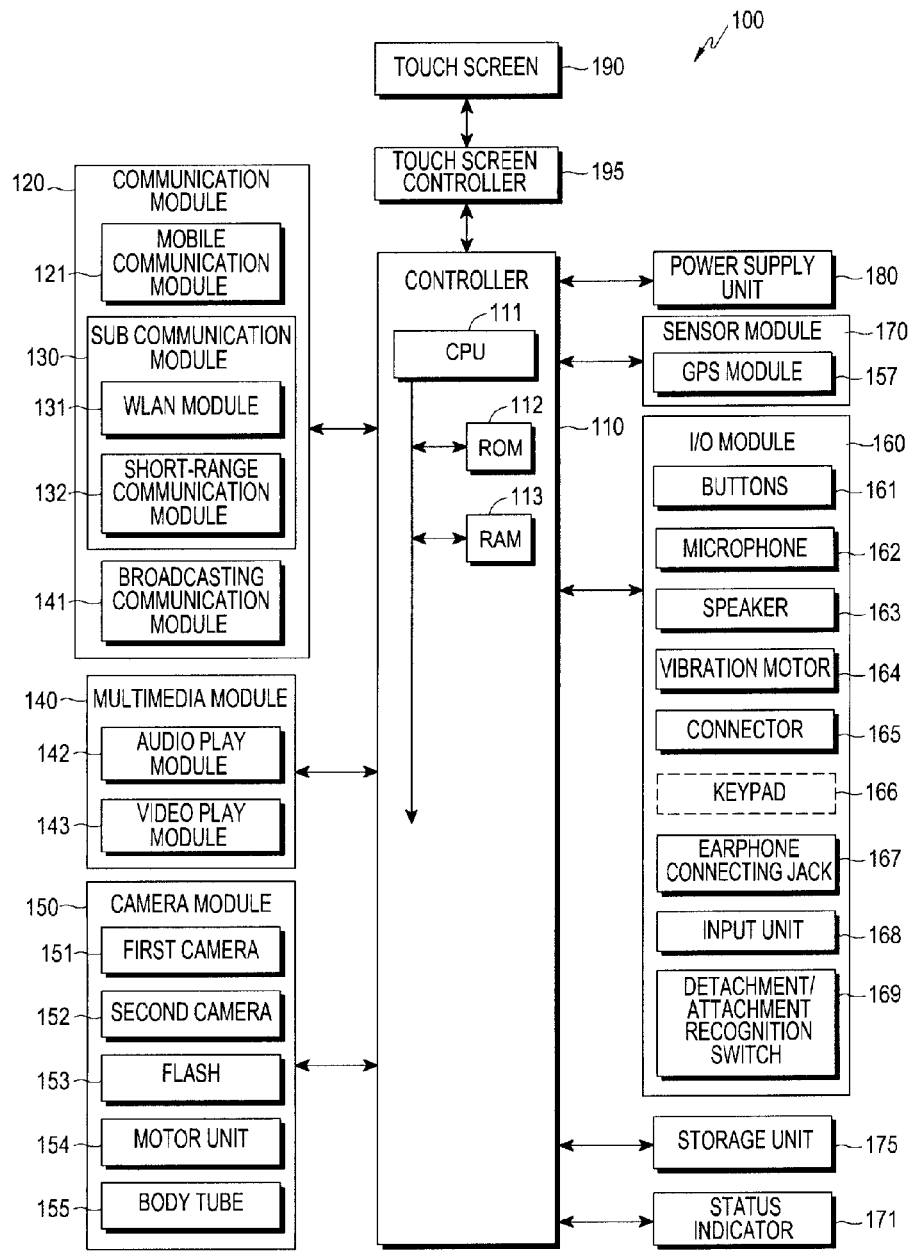
FIG. 13 is a block diagram illustrating a configuration of an electronic device according to aspects of the present disclosure.

FIG. 13 is a block diagram illustrating a configuration of an electronic device in accordance with aspects of the present disclosure.

An electronic device 100 illustrated in FIG. 13 may be the first electronic device or the second electronic device described above in the embodiments of the present disclosure.

Accordingly, the electronic device 100 may be any device including a communication unit and a display unit. The electronic device 100 may be called a camera, a portable device, a mobile terminal, a communication terminal, a portable communication terminal, or a portable mobile terminal. For example, the electronic device 100 may be a digital camera, a smart phone, a mobile phone, a game, a TV, a display device, a head unit for vehicle, a notebook computer, a laptop computer, a tablet computer, a PMP, PDA, a navigation system, an ATM, or a POS terminal. Also, the electronic device 100 may be a flexible device or a flexible display device.

As an example of the electronic device 100, the first electronic device may be a watch-type device, and the second electronic device may be a portable device (e.g., a mobile phone or a smart phone). Some components of the electronic device 100, which will be described below, may be omitted or modified as necessary. Hereinafter, a configuration of the electronic device 100 to which embodiments of the present disclosure can be applied will be described with reference to FIG. 13.

Referring to FIG. 13, the electronic device 100 may connect to an external electronic device (not shown) using at least one of a communication module 120, a connector 165, and an earphone connecting jack 167. The external electronic device may be one of various devices that can be connected/disconnected to/from the electronic device 100 in a wired fashion, such as earphones, an external speaker, a Universal Serial Bus (USB) memory, a charger, a cradle, a docking station, a Digital Multimedia Broadcasting (DMB) antenna, a mobile payment system, a health care system (a blood glucose meter, etc.), a game, or a car navigation system. In addition, the external electronic device may include a short-range communication device, such as a Bluetooth communication device and a Near Field Communication (NFC) device, which can be connected in a wireless fashion to the electronic device 100 through short-range communication, a Wireless Fidelity (Wi-Fi) Direct communication device, and a Wireless Access Point (WAP). Also, the electronic device 100 may connect to another portable device or electronic device (e.g., a mobile phone, a smart phone, a tablet PC, a desktop PC, or a server) in a wired/wireless fashion.

The electronic device 100 may include at least one touch screen 190 and at least one touch screen controller 195. Also, the electronic device 100 may include a controller 110, the communication module 120, a multimedia module 140, a camera module 150, an input/output module 160, a sensor module 170, a storage unit 175, and a power supply unit 180. The communication module 120 may include a mobile communication module 121, a sub communication module 130, and a broadcasting communication module 141. The sub communication module 130 may include at least one of a WLAN module 131 and a short-range communication module 132, and the multimedia module 140 may include at least one of an audio play module 142 and a video play module 143. The camera module 150 may include at least one of a first camera 151 and a second camera 152. The input/output module 160 may include at least one(s) of a plurality of buttons 161, a microphone 162, a speaker 163, a vibration motor 164, the connector 165, and a keypad 166.

The controller 110 may include a Central Processing Unit (CPU) 111, a Read Only Memory (ROM) 112 that stores control programs for controlling the electronic device 100, and a Random Access Memory (RAM) 113 that stores signals/data received from an external device or tasks being executed by the electronic device 100. The CPU 111 may be a single-core, a dual-core, a triple-core, or a quad-core. The CPU 111, the ROM 112, and the RAM 113 may be connected to each other through internal buses.

The controller 110 may control at least one of the communication module 120, the multimedia module 140, the camera module 150, the GPS module 157, the input/output module 160, the sensor module 170, the storage unit 175, the power supply unit 180, the touch screen 190, and the touch screen controller 195.

The controller 110 may detect a user input event such as a hovering event when occurs when an input unit 168 approaches the touch screen 190 or is positioned close to the touch screen 190. Also, the controller 110 may detect various user inputs received through the camera module 150, the input/output module 160, and the sensor module 170, as well as the touch screen 190. The user input may include various kinds of information input to the electronic device 100, such as the user's gesture, the user's voice, the user's eye movements, the user's iris recognition, and a physiological signal from the user, as well as a touch operation. The controller 110 may control the electronic device 100 to perform a predetermined operation or function corresponding to the detected user input.

Also, the controller 110 may output a control signal to the input unit 168 or the vibration motor 164. The control signal may include information about a vibration pattern, and the input unit 168 or the vibration motor 164 may generate vibration according to the vibration pattern. The information about the vibration pattern may be the vibration pattern or an identifier of the vibration pattern. The control signal may be a request for generating vibration.

The electronic device 100 may include at least one of the mobile communication module 121, the WLAN module 131, and the short-range communication module 132, according to performance.

The mobile communication module 121 enables the electronic device 100 to connect to an external device through mobile communication using at least one antenna (not shown) under the control of the controller 110. The mobile communication module 121 may transmit/receive radio signals for voice calls, video calls, Short Message Service (SMS), or Multimedia Message Service (MMS) with a device (not shown) such as a mobile phone, a smart phone, a tablet PC, or a second electronic device having a phone number input to the electronic device 100, to/from the electronic device 100.

The sub communication module 130 may include, as described above, at least one of the WLAN module 131 and the short-range communication module 132. For example, the sub communication module 130 may include only the WLAN module 131, only the short-range communication module 132, or both the WLAN module 131 and the short-range communication module 132.

The WLAN module 131 may connect to the Internet at a place in which a wireless Access Point (AP) is installed, under the control of the controller 110. The WLAN module 131 supports IEEE802.11x. The short-range communication module 132 may perform wireless short-range communication between the electronic device 100 and an external electronic device under the control of the controller 110. The short-range communication may include Bluetooth, Infrared Data Association (IrDA), WiFi-Direct communication, and Near Field Communication (NFC).

The broadcasting communication module 141 may receive broadcasting signals (for example, TV broadcasting signals, radio broadcasting signals, or data broadcasting signals) and broadcasting additional information (for example, an Electric Program Guide (EPS) or an Electric Service Guide (ESG)) transmitted from a broadcast station through a broadcasting communication antenna (not shown), under the control of the controller 110.

The multimedia module 140 may include an audio play module 142 or a video play module 143. The audio play module 142 may reproduce a digital audio file (e.g., a file having the filename extension of ".mp3", ".wma", ".ogg", or ".wav", for example) that is stored in the storage unit 175 or received, under the control of the controller 110. The video play module 143 may reproduce a digital video file (for example, a file having the filename extension of ".mpeg", ".mpg" ".mp4", ".avi", ".mov", or ".mkv", for example) or a digital audio file that is stored or received under the control of the controller 110.

The multimedia module 140 may be integrated into the controller 110. The camera module 150 may include at least one of the first camera 151 and the second camera 152 for photographing still images or moving images under the control of the controller 110. Also, the camera module 150 may also include at least one among a body tube 155 for zooming in/out to photograph a subject, a motor unit 154 for controlling movements of the body tube 155, and a flash 153 for providing a secondary light source required for photographing the subject. The first camera 151 may be disposed in the front side of the electronic device 100, and the second camera 152 may be disposed in the rear side of the electronic device 100.

The input/output module 160 may include at least one among the buttons 161, the microphone 162, the speaker 163, the vibration motor 164, the connector 165, the keypad 166, the earphone connecting jack 167, and the input unit 168. However, the input/output module 160 is not limited to the above-mentioned devices, and a cursor control, such as a mouse, a trackball, a joystick, or cursor direction keys, may also be provided to control the movement of a cursor on the touch screen 190.

The buttons 161 may be provided in the front, side, and/or rear part of the housing (or the case) of the electronic device 100. The buttons 161 may include at least one of a power/lock button (not shown), volume buttons (not shown), a menu button (not shown), a home button (not shown), a back button (not shown), and a search button (not shown). The microphone 162 may receive voice or sound to generate an electrical signal, under the control of the controller 110. The speaker 163 receives sound corresponding to various signals or data (e.g., radio data, broadcasting data, digital audio data, or digital video data) to the outside of the electronic device 100, under the control of the controller 110. Also, the speaker 163 may output sound (e.g., button sounds, currency connection sounds, or the other party user's voice) corresponding to a function that is performed by the electronic device 100. The speaker 163 may be provided as at least one unit at an appropriate location (or locations) on the housing of the electronic device 100.

The vibration motor 164 converts an electrical signal into mechanical vibration under the control of the controller 110. For example, when the electronic device 100 is in a vibration mode, the vibration motor 164 operates if a voice call or a video call is received from another device (not shown). The vibration motor 164 may be provided as at least one unit in the housing of the electronic device 100. The vibration motor 164 may operate in response to a user's input to the touch screen 190.

The connector 165 may be used as an interface for connecting the electronic device 100 to an external electronic device (not shown) or a power source (not shown). The controller 110 may transmit data stored in the storage unit 175 of the electronic device 100 to an external electronic device (not shown) through a wired cable connected to the connector 165, or the controller 110 may receive data of an external electronic device through the wired cable connected to the connector 165. The electronic device 100 may receive power or charge a battery (not shown) from a power source (not shown) through the wired cable connected to the connector 165.

The keypad 166 may receive key input from a user in order to control the electronic device 100. The keypad 166 may include a physical keypad (not shown) that is provided on the electronic device 100, or a virtual keypad (not shown) that is displayed on the touch screen 190. The electronic device 100 may include no physical keypad according to a structure of the electronic device 100. The earphone (not shown) may be inserted into the earphone connecting jack 167 to connect to the electronic device 100.

The input unit 168 may be inserted into and held in the electronic device 100, and when in use, the input unit 168 may be drawn or separated from the electronic device 100. A detachment/attachment recognition switch 169 that operates in correspondence to attachment and detachment of the input unit 168 may be provided in an area of the electronic device 100 into which the input unit 168 is inserted. The detachment/attachment recognition switch 169 may output a signal corresponding to attachment/separation of the input unit 168 to the controller 110. The detachment/attachment recognition switch 169 may be configured to directly or indirectly contact the input unit 168 when the input unit 168 is attached in the electronic device 100. Accordingly, the detachment/attachment recognition switch 169 may generate a signal (i.e., a signal for notifying attachment or separation of the input unit 168) corresponding to attachment or separation of the input unit 168 based on whether the detachment/attachment recognition switch 169 contacts the input unit 168, and outputs the signal to the controller 110.

The sensor module 170 may include at least one sensor for detecting a status of the electronic device 100. For example, the sensor module 170 may include at least one sensor among a proximity sensor (not shown) for determining whether a user approaches the electronic device 100, an ambient light sensor (not shown) for measuring an amount of ambient light around the electronic device 100, a motion sensor (not shown) for detecting motion (rotation, acceleration, or vibration) of the electronic device 100, a geomagnetic sensor (not shown) for detecting a point of the compass of the electronic device 100 using the earth's magnetic field, a gravity sensor (not shown) for detecting a direction in which gravity is applied, an altimeter (not shown) for measuring atmospheric pressure to detect an altitude, and a GPS module 157.

The GPS module 157 may receive radio waves from a plurality of GPS satellites (not shown) on the orbit around the earth, and calculate the location of the electronic device 100 based on a time of arrival of the radio waves from the GPS satellites to the electronic device 100.

The storage unit 175 may store signals or data that is input/output according to operations of the communication module 120, the multimedia module 140, the camera module 150, the input/output module 160, the sensor module 170, and the touch screen 190, under the control of the controller 110. The storage unit 175 may store control programs and applications for controlling the electronic device 100 or the controller 110.

In this description, the term a "storage unit" includes the storage unit 175, ROM 112 or RAM 113 included in the controller 110, and a memory card (not shown, for example, a Secure Digital (SD) card or a memory stick) installed in the electronic device 100. The storage unit 175 may include a non-volatile memory, a volatile memory, a Hard Disk Drive (HDD), or a Solid State Drive (SSD).

The storage unit 175 may store applications with various functions, such as navigation, a video call, games, a time-based alarm application, etc., images for providing a user with Graphic User Interfaces (GUIs) associated with the applications, user information, document, databases or data related to a method of processing touch inputs, background images (a menu screen, a lock screen, etc.) or operation programs required to drive the electronic device 100, images photographed by the camera module 150, etc.

The storage unit 175 may be include non-transitory machine (for example, a computer)-readable media, and the term "machine-readable media" can be defined as media of providing data to a machine so that the machine can perform a specific function. The storage unit 175 may include non-volatile media and volatile media. Such a medium needs to be of a tangible type so that commands delivered to the medium can be detected by a physical tool which reads the commands with the machine.

The non-transitory machine-readable media may include at least one among a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), a FLASH-EPROM, and an embedded Multi Media Card (eMMC)

The power supply unit 180 may supply power to one or more batteries installed in the housing of the electronic device 100 under the control of the controller 110. The one or more batteries supply power to the electronic device 100. The power supply unit 180 may supply power received from an external power source to the electronic device 100 through a wired cable connected to the connector 165. The power supply unit 180 may supply power received wirelessly from an external power source to the electronic device 100 through wireless charging technology.

The electronic device 100 may include at least one touch screen 190 that provides a user with GUIs corresponding to various services (for example, a call, data transmission, broadcasting, and photographing). The touch screen 190 may output an analog signal corresponding to at least one user input inputted to a GUI to the touch screen controller 195.

The touch screen 190 may receive at least one user input through a user's body part (for example, a finger including a thumb) or the input unit 168 (for example, a stylus pen or an electronic pen). The touch screen 190 may be a resistive touch screen, a capacitive touch screen, an infrared touch screen, an acoustic wave touch screen, or a combination thereof.

The touch screen 190 may also include at least two touch panels for respectively sensing touches or approaches of a finger and the input unit 168 so as to respectively receive inputs by the finger and the input unit 168. The at least two touch panels provide different output values to the touch screen controller 195, and the touch screen controller 195 recognizes the different output values received from the at least two touch panels to determine whether an input to the touch screen 190 is an input by a finger or an input by the input unit 168.

In this specification, the term "touch" is not limited to a contact of a user's body part or a pointing device to the touch screen 190, and may include non-contact recognition (for example, when a user's body part or a pointing device is located within a recognition distance (for example, 1 mm) in which the user's body part or the pointing device can be detected without a direct contact to the touch screen 190). The recognition distance in which the touch screen 190 can recognize the user's body part or the pointing device may depend on the performance or structure of the electronic device 100.

The touch screen controller 195 may convert an analog signal received from the touch screen 190 into a digital signal, and transfers the digital signal to the controller 110. The controller 110 may control the touch screen 190 using the digital signal received from the touch screen controller 195. The touch screen controller 195 may detect a value (for example, a current value) output through the touch screen 190 to determine an hovering interval or distance as well as a user's input location, convert the determined distance value into a digital signal (for example, a z coordinate), and then provide the digital signal to the controller 110. The touch screen controller 195 may detect a value (for example, a current value) output through the touch screen 190 to estimate pressure with which a user input device presses the touch screen 190, convert the estimated pressure value into a digital signal, and then provide the digital signal to the controller 110.

Figure 14:
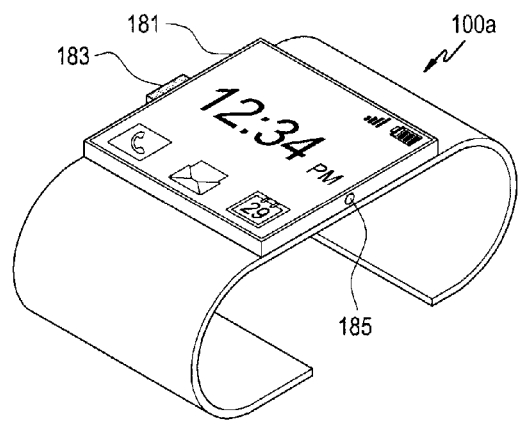
FIG. 14 illustrates a wearable device according to aspects of the present disclosure.

FIG. 14 illustrates a wearable device in accordance with aspects of the present disclosure. The wearable device may be a watch-type device which a user can wear on his/her wrist like a general watch. The wearable device may include a CPU for computation, a display unit to display information, and a communication unit to communicate with another electronic device. Also, the wearable device may include a camera to photographs images wherein the camera can be used as a camera for recognition.

As illustrated in FIG. 14, an electronic device 100*a* is a watch-type device, and the watch-type device 100*a* may include a storage unit, a controller, and an input/output device, wherein the storage unit has a relatively smaller storage capacity and a relatively lower processing capability than a second electronic device (e.g., a mobile device). For example, the watch-type device 100a may be a small-sized terminal that can be worn on a user's body part. Also, the watch-type device 100a may be coupled with a predetermined hardware member (e.g., a watch chain) so that a user can wear the watch-type device 100a on his/her wrist.

The watch-type device 100a may include a touch screen 181 having a predetermined size as an input/output unit, and may further include at least one hardware button 183.

In one example, the watch-type 100a may detect a gesture, determine whether the detected gesture is substantially identical or similar to a predetermined gesture, and enable a camera based on the result of the determination.

Figure 15:
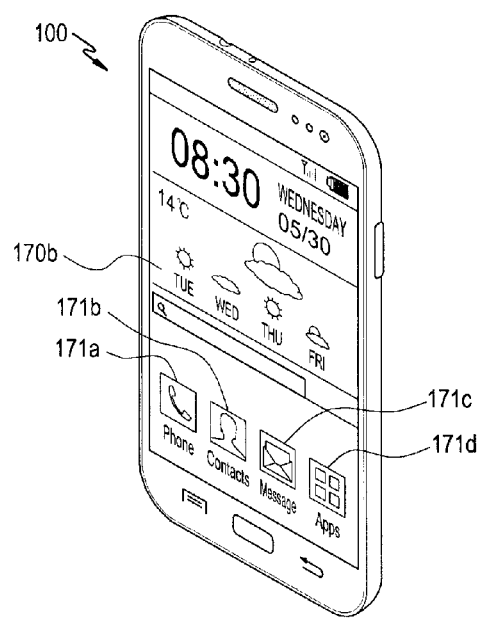
FIG. 15 illustrates an electronic device according to aspects of the present disclosure.

FIG. 15 illustrates an electronic device in accordance with aspects of the present disclosure. An electronic device 100 illustrated in FIG. 15 may be a second electronic device, and transmit information corresponding to an application being currently executed.

Referring to FIG. 15, a touch screen 170b may be disposed in the front, center part of the electronic device 100. The touch screen 170b may occupy the major area of the front part of the electronic device 100.

A home screen that is displayed on the touch screen 170b may include a plurality of different home screens in the form of several pages, and the first one of the home screens may be a main home screen as illustrated in FIG. 15. On the home screen, shortcut icons 171a, 171b, and 171c for executing applications often executed, a main menu conversion key 171d, clock, weather, and the like may be displayed. The main menu conversion key 171d is used to display a menu screen on the touch screen 170b. On the upper area of the touch screen 170b, a status bar representing the status of the electronic device 100, such as battery level, intensity of reception signals, current time, and a volume adjusting mode, may be displayed.

The methods according to the embodiments of the present disclosure may be implemented as computer-executable programs executable by various computational devices and stored in non-transitory computer-readable medium. The non-transitory computer readable medium may include a program command, a data file, a data structure, or a combination thereof. The program command written to the non-transitory computer readable medium may be specially designed and configured or may be already known to those skilled in the field of computer software.

The methods according to the embodiments of the present disclosure may be embodied in the form of program commands and stored in the storage unit 175 of the electronic device 100. The program commands may be temporarily stored in the RAM 113 of the controller 110 in order to execute the methods according to the embodiments of the present disclosure. Accordingly, the controller 110 may control hardware components included in the electronic device 100 to correspond to the program commands according to the methods according to the embodiments of the present disclosure, temporarily or permanently store data generated when the methods according to the embodiments of the present disclosure are executed, in the storage unit 175, and provide UIs required to execute the methods according to the embodiments of the present disclosure to the touch screen controller 195.

According to the embodiments of the present disclosure, by providing UX to a watch-type device having a small-sized screen, users can feel the light weight of an analog watch-type device while efficiently utilizing the watch-type device.

Also, according to the embodiments of the present disclosure, battery efficiency can be improved through efficient management of power for screen display.

In addition, according to the embodiments of the present disclosure, information corresponding to an application being executed in a second electronic device can be displayed on a display unit.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A control method of an electronic device, comprising:
   detecting a gesture through a sensor module by comparing the detected gesture to a predetermined gesture;
   activating a camera of the electronic device, when the detected gesture corresponds to the predetermined gesture;
   photographing a plurality of images of a user during a predetermined time period using the camera;
   determining whether the user has been staring at the electronic device during the predetermined time period based on the plurality of images, wherein determining whether the user has been staring at the electronic device comprises:
   identifying at least one of the user's face contours or the user's pupils from the plurality of images, and
   determining that the user has been staring at the electronic device during the predetermined time period if at least one of a change detected in the user's face contours or a change detected in the user's pupils is less than a predetermined threshold for the predetermined time period; and
   performing a predetermined function, when it is determined that the user has been staring at the electronic device during the predetermined time period, wherein performing the predetermined function comprises:
   connecting the electronic device to a second electronic device through communication,
   determining whether an application is being executed in the second electronic device,
   displaying information corresponding to the application being executed in the second electronic device, when determining that the application is being executed in the second electronic device, and
   displaying an idle mode, when determining that the application is not being executed in the second electronic device.

2. The control method of claim 1, wherein performing the predetermined function further comprises turning on a screen of the electronic device.

3. The control method of claim 1, wherein performing the predetermined function further comprises changing from an off mode to a call mode.

4. The control method of claim 1, wherein performing the predetermined function further comprises changing from an off mode to a message reception mode.

5. The control method of claim 1, wherein performing the predetermined function further comprises changing from an off mode to a music play mode.

6. The control method of claim 1, wherein performing the predetermined function further comprises changing from an off mode to an exercise mode.

7. An electronic device comprising:
   a camera module;

a sensor module;
communication unit;
a display unit; and
a processor configured to:
detect a gesture through the sensor module by comparing the detected gesture to a predetermined gesture;
activate the camera module, when the detected gesture corresponds to the predetermined gesture;
control the activated camera module to photograph a plurality of images of a user during a predetermined time period;
determine whether the user has been staring at the electronic device during the predetermined time period based on the plurality of images, wherein determine whether the user has been staring at the electronic device comprises:
identify at least one of the user's face contours or the user's pupils from the plurality of images, and
determine that the user has been staring at the electronic device during the predetermined time period if at least one of a change detected in the user's face contours or a change detected in the user's pupils is less than a predetermined threshold for the predetermined time period; and
perform a predetermined function, when it is determined that the user has been staring at the electronic device during the predetermined time period, wherein perform the predetermined function comprises:
connect the electronic device to a second electronic device through the communication unit,
determine whether an application is being executed in the second electronic device,
display information in the display unit corresponding to the application being executed in the second electronic device, when determined that the application is being executed in the second electronic device, and
display an idle mode in the display unit, when determined that the application is not being executed in the second electronic device.

8. The electronic device of claim 7, wherein the predetermined function further comprises turning on a screen of the electronic device.

9. The electronic device of claim 7, wherein the predetermined function further comprises changing from an off mode to a call mode.

10. The electronic device of claim 7, wherein the predetermined function further comprises changing from an off mode to a message reception mode.

11. The electronic device of claim 7, wherein the predetermined function further comprises changing from an off mode to a music play mode.

12. The electronic device of claim 7, wherein the predetermined function further comprises changing from an off mode to an exercise mode.

13. A non-transitory and physical computer-readable medium storing instructions therein which upon execution instructs at least one processor configured to:
detect a gesture through a sensor module by comparing the detected gesture to a predetermined gesture;
activate a camera of an electronic device, when the detected gesture corresponds to the predetermined gesture;
photograph a plurality of images of a user during a predetermined time period using the camera;
determine whether the user has been staring at the electronic device during the predetermined time period based on the plurality of images, wherein determine whether the user has been staring at the electronic device comprises:
identify at least one of the user's face contours or the user's pupils from the plurality of images, and
determine that the user has been staring at the electronic device during the predetermined time period if at least one of a change detected in the user's face contours or a change detected in the user's pupils is less than a predetermined threshold for the predetermined time period; and
perform a predetermined function, when it is determined that the user has been staring at the electronic device during the predetermined time period, wherein perform the predetermined function comprises:
connect the electronic device to a second electronic device through communication,
determine whether an application is being executed in the second electronic device,
display information corresponding to the application being executed in the second electronic device, when determined that the application is being executed in the second electronic device, and
display an idle mode, when determined that the application is not being executed in the second electronic device.

* * * * *